(12) United States Patent  
Watkins et al.

(10) Patent No.: US 11,010,300 B2  
(45) Date of Patent: May 18, 2021

(54) OPTIMIZED RECORD LOOKUPS

(71) Applicant: HEWLETT PACKARD ENTERPRISE DEVELOPMENT LP, Houston, TX (US)

(72) Inventors: Glenn Watkins, Northborough, MA (US); Peter Madany, Westborough, MA (US); John M. Czerkowicz, Wakefield, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 227 days.

(21) Appl. No.: 15/586,947

(22) Filed: May 4, 2017

(65) Prior Publication Data

US 2018/0322062 A1     Nov. 8, 2018

(51) Int. Cl.
     *G06F 12/0864*      (2016.01)
     *G06F 16/13*      (2019.01)
     *G06F 12/0804*      (2016.01)

(52) U.S. Cl.
     CPC ...... *G06F 12/0864* (2013.01); *G06F 12/0804* (2013.01); *G06F 16/137* (2019.01); *G06F 2212/60* (2013.01)

(58) Field of Classification Search
     CPC ............. G06F 16/2255; G06F 16/9535; G06F 16/137; G06F 16/152; G06F 16/2237;
(Continued)

(56) References Cited

U.S. PATENT DOCUMENTS

| | | | |
|---|---|---|---|
| 5,396,470 A | 3/1995 | Storn | |
| 5,555,389 A * | 9/1996 | Satoh | .................. G06F 11/1456 707/999.202 |

(Continued)

FOREIGN PATENT DOCUMENTS

| | | |
|---|---|---|
| CN | 102542052 A | 7/2012 |
| CN | 104115134 A | 10/2020 |

(Continued)

OTHER PUBLICATIONS

Google Search (Year: 2013).*

(Continued)

*Primary Examiner* — Mark D Featherstone
*Assistant Examiner* — Kweku William Halm
(74) *Attorney, Agent, or Firm* — Jaffery Watson Mendonsa & Hamilton

(57) ABSTRACT

In some examples, a method can involve generating data object records representing data objects in storage and storing, on a device, a lookup index including a plurality of index buckets, each index bucket being associated with a set of storage units on the device and including a respective index filter for each respective one of the set of storage units, the set of storage units containing a respective portion of the data object records, wherein each respective index filter includes at least one lookup entry for each data object record in the respective one of the set of storage units. The method can also involve receiving a data object request, and performing a lookup operation including identifying an index bucket for the data object and determining whether any of the set of storage units associated with the index bucket contains a data object record corresponding to the data object.

15 Claims, 8 Drawing Sheets

(58) Field of Classification Search
CPC ...... G06F 3/0604; G06F 3/0644; G06F 3/064;
G06F 12/0804; G06F 12/084; G06F
12/0811; G06F 12/0891; G06F
2212/1016; G06F 16/22; G06F 16/9024;
G06F 3/067; G06F 21/602; G06F 16/29;
G06F 16/2272; G06F 16/951; G06Q
30/02

See application file for complete search history.

(56) References Cited

U.S. PATENT DOCUMENTS

| | | | |
|---|---|---|---|
| 6,115,705 | A | 9/2000 | Larson |
| 6,625,612 | B1 | 9/2003 | Tal et al. |
| 7,103,595 | B2 | 9/2006 | Anastasiadis et al. |
| 7,139,781 | B2 | 11/2006 | Young |
| 7,454,592 | B1* | 11/2008 | Shah ............... G06F 16/137 711/216 |
| 7,747,663 | B2 | 6/2010 | Atkin et al. |
| 7,814,078 | B1 | 10/2010 | Forman |
| 8,028,106 | B2 | 9/2011 | Bondurant et al. |
| 8,140,625 | B2 | 3/2012 | Dubnicki et al. |
| 8,140,786 | B2 | 3/2012 | Bunte et al. |
| 8,478,799 | B2 | 7/2013 | Beaverson et al. |
| 9,928,178 | B1* | 3/2018 | Solapurkar ......... H04L 67/2842 |
| 10,241,722 | B1* | 3/2019 | Malwankar ........... G06F 3/0659 |
| 2004/0148306 | A1 | 7/2004 | Moulton et al. |
| 2004/0220975 | A1 | 11/2004 | Carpentier et al. |
| 2006/0036898 | A1 | 2/2006 | Doering |
| 2009/0157972 | A1 | 6/2009 | Byers et al. |
| 2011/0145207 | A1 | 6/2011 | Agrawal et al. |
| 2011/0276744 | A1* | 11/2011 | Sengupta ............ G06F 12/0866 711/103 |
| 2011/0276781 | A1* | 11/2011 | Sengupta ............ G06F 12/0862 711/216 |
| 2011/0307447 | A1 | 12/2011 | Sabaa et al. |
| 2013/0318051 | A1 | 11/2013 | Kumar et al. |
| 2015/0379060 | A1* | 12/2015 | Levandoski ........ G06F 16/2322 707/607 |
| 2016/0139981 | A1* | 5/2016 | Chennamsetty .... G06F 11/1008 714/773 |
| 2017/0124128 | A1 | 5/2017 | Oks et al. |
| 2017/0169069 | A1* | 6/2017 | Manjunath .......... G06F 16/2365 |
| 2017/0199891 | A1 | 7/2017 | Aronovich et al. |
| 2019/0325048 | A1 | 10/2019 | Watkins et al. |

FOREIGN PATENT DOCUMENTS

| | | |
|---|---|---|
| JP | 2012-531675 | 11/1992 |
| WO | 201015181 A1 | 11/2010 |
| WO | 2010151813 A1 | 12/2010 |
| WO | WO-2017180144 A1 | 10/2017 |

OTHER PUBLICATIONS

Petition for Inter Partes Review of U.S. Pat. No. 8,478,799 before the USPTO Patent Trial and Appeal Board dated Sep. 14, 2016, Case IPR2016-01779.

Declaration of Darrell D.E.Long, Ph.D. Regarding U.S. Pat. No. 8,478,799 dated Sep. 14, 2016, Case IPR2016-01779 (Springpath Exhibit 1002).

Li, et al., Secure Untrusted Data Repository (SUNDR), OSDI '04: 6th Symposium on Operating Systems Design and Implementation, pp. 122-136, USENIX Association (Springpath Exhibits 1003 & 1103).

Sandberg, et al., Design and Implementation of the Sun Network Filesystem, Sun Microsystems, Mountain View, CA, (12 pp.) (Springpath Exhibits 1004 & 1116).

US Patent and Trademark Office non-final Office Action dated Aug. 30, 2012 in U.S. Appl. No. 12/823,922 (Springpath Exhibits 1006 & 1106).

Response to USPTO non-final Office Action dated Aug. 30, 2012 filed Dec. 18, 2012 in U.S. Appl. No. 12/823,922 (Springpath Exhibits 1009 & 1109).

Quinlan, et al., Venti: a new approach to archival storage, Bell Labs, Lucent Technologies, 1-13 pp (Springpath Exhibits 1008 & 1108).

US Patent and Trademark Office final Office Action dated Feb. 22, 2013 in U.S. Appl. No. 12/823,922 (Springpath Exhibits 1010 & 1110).

Response to USPTO final Office Action dated Feb. 22, 2013, filed May 8, 2013 in U.S. Appl. No. 12/823,922 (Springpath Exhibits 1012 & 1112).

Best, et al., How the Journaled File System handles the on-disk layout, May 2000, IBM: developerWorks: Linux library/Open source library Internet download Apr. 18, 2001; http://swgiwas001.sby.ibm.com/developerworks/library/jfslayout/index1.html (Springpath Exhibits 1011 & 1111).

US Patent and Trademark Office Notice of Allowance dated May 29, 2013 in U.S. Appl. No. 12/823,922 (Springpath Exhibits 1013 & 1113).

Petition for Inter Partes Review of U.S. Pat. No. 8,478,799 before the USPTO Patent Trial and Appeal Board dated Sep. 14, 2016, Case IPR2016-01780.

Declaration of Darrell D.E.Long, Ph.D. Regarding U.S. Pat. No. 8,478,799 dated Sep. 14, 2016, Case IPR2016-01780 (Springpath Exhibit 1102).

IEEE the Open Group, 1003.1TM Standard for Information Technology—Portable Operating System Interface (POSIX (R)) System Interfaces, Issue 6, IEEE Std 1003.1-2001, Approved Sep. 12, 2001 The Open Group (2 pp.) (Springpath Exhhibits 1014 & 1114).

IEEE the Open Group, 1003.1TM Standard for Information Technology—Portable Operating System Interface (POSIX (R)) Base Definitions, Issue 6, IEEE Std 1003.1-2001, Approved Sep. 12, 2001 The Open Group (8 pp.) (Springpath Exhibits1015 & 1115).

USPTO PTAB Decision Denying Institution of Inter Partes Review entered Mar. 22, 2017, *Springpath, Inc. v. SimpliVity Corp.*, Case IPR2016-01779, U.S. Pat. No. 8,478,799 B2.

USPTO PTAB Patent Owner's Preliminary Response dated Dec. 27, 2016, *Springpath, Inc. v. SimpliVity Corp.*, Case IPR2016-01779, U.S. Pat. No. 8,478,799 B2 (SimpliVity Exhibits 2001-2009 listed below).

Wikipedia: "Object Storage" (available at https://en.wikipedia.org/wiki/Object_storage) (last visited Dec. 6, 2016), SimpliVity Exhibit 2001, *Springpath v. SimpliVity* IPR2016-01779.

Webopedia: "Inode" (available at http://www.webopedia.com/TERM/I/inode.html) (last visited Dec. 20, 2016), SimpliVity Exhibit 2002, *Springpath v. SimpliVity* IPR2016-01779.

Presentation: "Object Storage technology," Storage Networking Industry Association, 2013 (available at http://www.snia.org/sites/default/education/tutorials/2013/spring/file/BrentWelch_Object_Storage_Technology.pdf) (last visited Dec. 22, 2016), SimpliVity Exhibit 2003, *Springpath v. SimpliVity* IPR2016-01779.

"Object Storage versus Block Storage: Understanding the Technology Differences," Aug. 14, 2014 (available at http://www.druva.com/blog/object-storage-versus-block-storage-understanding-technology-differences/) (last visited Dec. 22, 2016), SimpliVity Exhibit 2004, *Springpath v. SimpliVity* IPR2016-01779.

"Understanding Object Storage and Block Storage use cases," Jul. 20, 2015 (available at http://cloudacademy.com/blog/object-storage-block-storage/) (last visited Dec. 22, 2016), SimpliVity Exhibit 2005, *Springpath v. SimpliVity* IPR2016-01779.

"OBFS: A File System for Object-based Storage Devices." Feng, et al., 2004, SimpliVity Exhibit 2006, *Springpath v. SimpliVity* IPR2016-01779.

"Oasis: An active storage framework for object storage platform," Xie, et al., 2015, SimpliVity Exhibit 2007, *Springpath v. SimpliVity* IPR2016-01779.

Wikipedia: "Namespace" (available at https://en.wikipedia.org/wiki/Namespace) (last visited Dec. 6, 2016), SimpliVity Exhibit 2008, *Springpath v. SimpliVity* IPR2016-01779.

Weopedia: "Namespace" (available at http://www.webopedia.com/TERM/N/namespace.html) (last visited Dec. 20, 2016), SimpliVity Exhibit 2009, *Springpath v. SimpliVity* IPR2016-01779.

(56) References Cited

OTHER PUBLICATIONS

USENIX Association, "Proceedings of the First Symposium on Networked Systems Design and Implementation," Mar. 2004, pp. 1-15, San Francisco, CA, USA.
Simplivity Corporation's Reply Claim Construction Brief, Case 4:15-cv-13345-TSH, Document 132, Jul. 24, 2017, pp. 1-23.
Simplivity Corporation's Opening Claim Construction Brief, Case 4:15-cv-13345-TSH, Document 130, Jul. 10, 2017, pp. 1-21.
SimpliVity Corporation's Markman Hearing Transcript, Case No. 15cv13345-TSH, Aug. 16, 2017, pp. 1-119.
Prosecution History of the U.S. Pat. No. 8,478,799 patent, 576 pages.
Petitioner's Reply to Patent Owner's Preliminary Response, Case IPR2017-01933, U.S. Pat. No. 8,478,799, Feb. 28, 2018, pp. 1-17.
Patent Owner's Preliminary Response Pursuant to 37 CFR 42.107(a), Case IPR2017-01933, U.S. Pat. No. 8,478,799, Dec. 21, 2017, pp. 1-47.
Joint Claim Construction and Prehearing Statement, Case 4:15-cv-13345-TSH, Document 136, Aug. 7, 2017, pp. 1-8.
Hewlett Packard Enterprise Company's Response to Springpath's Supplemental Claim Construction Brief, C.A. No. 4:15-cv-13345-TSH, Oct. 30, 2017, pp. 1-5.
Frank Dabek, "A Distributed Hash Table," Sep. 2005, pp. 1-135, Massachusetts Institute of Technology.
Defendant Springpath, Inc.'s Repiy Claim Construction Brief, Case 4:15-cv-13345-TSH, Document 133, Jul. 24, 2017, pp. 1-17.
Defendant Springpath, Inc.'s Preliminary Claim Construction Brief with Exhibits, Case 4:15-cv-13345-TSH, Document 129, Jul. 10, 2017, pp. 1-138.
Defendant Springpath, Inc.'s Motion for Leave to File Supplemental Claim Construction Brief, Case 4:15-cv-13345-TSH, Document 146, Oct. 17, 2017, pp. 1-5.
Decision Denying Institution of Inter Partes Review, Case IPR2017-01933, U.S. Pat. No. 8,478,799 B2, Mar. 16, 2018, pp. 1-18, USPTO.
Jul. 8, 2013 Int'l. Search Report and WRitten Opinion in corresponding PCT/US2013/027296.
Per-Ake Larson and Ajay Kajla, "File Organization: Implementation of a Method Guaranteeing Retrieval in one Access," 8070 Communications of the Association of Computing Machinery, 27 (198) July, No. 7, New York, USA, pp. 67-677.
Patent Examination Report No. 1 dated Jul. 23, 2015 in Australia Patent Application 2013222325 (Note: Examination Report incorrectly identifies WO2010/15181 instead of WO2010/151813, published Dec. 29, 2010, Applicant Simplivt Corp.).
Grant, R., "filesystem Interface for the Git Version Control system," Apr. 24, 2009, 14, Retrieved from the Internet http://www.seas.upenn.edu/~cse400/CSE400_2008_2009/websites/grant/final.pdf.
Chacon, S., "Pro Git," Berkeley, CA: Apress; New York 2009.
Office Action dated Sep. 17, 2015 in Japanese Patent Application No. 2014-558858 with English translation.
Examiner's Requisition dated Oct. 23, 2015 in Canadian Patent Application No. 2,865,240.
English translation of First Office Action dated Feb. 8, 2017 in Chinese Patent Appln. No. 201380017261.8.
Int'l. Preliminary Report on Patentability dated Jun. 16, 2014 in corresponding Int'l. Appln. No. PCT/US2013/027296.
IBM, AIX 5L Version 5.2 General Programming Concepts: Writing and Debugging Programs, 2004 ("GPC") (SPR00000788-SPR00001403).
IBM, AIX 5L Version 5.2 System Management Concepts: Operating System and Devices, 2004 ("SMC") (SPR00001404-SPR00001593).
USPTO PTAB Decision Denying Institution of Inter Partes Review entered Mar. 22, 2017, *Springpath, Inc.* v. *SimpliVity Corp.*, Case IPR2016-01780, U.S. Pat. No. 8,478,799 B2.
USPTO PTAB Patent Owner's Preliminary Response dated Dec. 27, 2016, *Springpath, Inc.* v. *SimpliVity Corp.*, Case IPR2016-01780, U.S. Pat. No. 8,478,799 B2 (SimpliVity Exhibits 2001-2009 identical to IPR2016-01779 and previously submitted).
Springpath Inc.'s Preliminary Invalidity Contentions, C.A. No. 4:15-cv-13345-TSH Document 101, filed Mar. 21, 2017 in the US Disctrict Court for the District of Massachusetts and Exhibit A1, listing references cited herein.
Li et al., Secure Untrusted Data Repository (SUNDR), 2004 ("Li")(SPR00000113-PR000000128).
Sandberg et al., Design and implementation of the Sun network filesystem, 1985 ("Sandberg")(SPR00000129-SPR00000140).
Quinlan et al., Venti: A New Approach to Archival Storage, 2002 ("Quinlan")(SPR00000141-SPR00000154).
Best et al., JFS Layout: How the Journaled File System Handles the On-Disk Layout, 2000 ("Best")(SPR00000155-SPR00000197).
Zhu et al., Avoiding the Disk Bottleneck in the Data Domain Deduplication File System, 2008 ("Zhu") (SPR00000198-SPR00000211).
Abd-El-Malek et al., Ursa Minor: Versatile Cluster-Based Storage, 2005 ("Abd-El-Malek")(SPR00000212-SPR00000225).
Bobbarjung et al., Improving Duplicate Elimination in Storage Systems, 2006 ("Bobbarjung")(SPR00000226-SPR00000248).
Cox et al., Pastiche: Making Backup Cheap and Easy, 2002 ("Cox")(SPR00000249-SPR00000263).
Dabek et al., Wide-Area Cooperative Storage With CFS, 2001 ("Dabek")(SPR00000264-SPR00000277).
Debnath et al., ChunkStash: Speeding up Inline Storage Deduplication Using Flash Memory, 2010 ("Debnath") (SPR00000278-SPR00000292).
Fu et al., Fast and Secure Distributed Read-Only File System, 2000 ("Fu 2000")(SPR00000293-SPR00000308).
Fu et al., Fast and Secure Distributed Read-Only File System, 2002 ("Fu")(SPR00000309-SPR00000332).
Mesnier et al., Object-Based Storage, 2003 ("Mesnier")(SPR00000333-SPR00000339).
Muthitacharoen et al., Ivy: A Read/Write Peer-to-Peer File System, 2002 ("Muthitacharoen")(SPR00000340-SPR00000353).
Rhea et al., Fast, Inexpensive Content-Addressed Storage in Foundation, 2008 ("Rhea")(SPR00000354-SPR00000367).
Richie et al., The UNIX Time-Sharing System, 1974 ("Richie")(SPR00000368-SPR00000378).
Levanoni et al., An On-the-Fly Reference-Counting Garbage Collector for Java, 2001 ("Levanoni")(SPR00000379-SPR00000445).
Boehm et al., Garbage Collection in an Uncooperative Environment, 1998 ("Boehm")(SPR00000446-SPR00000462).
1003.1™ Standard for Information Technology—Portable Operating System Interface (POSIX®), System Interfaces, Issue 6, 2001 ("POSIX_SI_2001")(SPR00000463-SPR00000464).
Harel Paz, Efficient Memory Management for Servers, 2006 ("Paz")(SPR00000465-SPR00000692).
Grembowski et al., Comparative Analysis of the Hardware Implementations of Hash Functions SHA-1 and SHA-512, 2002 ("Grembowski")(SPR00000693-SPR00000707).
Chaves et al., Cost-Efficient SHA Hardware Accelerators, 2008 ("Chaves")(SPR00000708-SPR00000717).
Hitz et al., File System Design for an NFS File Server Appliance, 1994 ("Hitz")(SPR00000718-SPR00000740).
Kawaguchi et al., A Flash-Memory Based File System, 1995 ("Kawaguchi")(SPR00000741-SPR00000750).
You et al., Deep Store: An Archival Storage System Architecture, 2005 ("You")(SPR00000751-SPR00000762).
McKusick et al., A fast file system for UNIX, 1984 ("McKusick")(SPR00000763-SPR00000779).
The EMC Centera and Tower Technology Advantage, 2002 ("Centera")(SPR00000780-SPR00000787).
Hutchinson et al., Logical vs. Physical File System Backup, 1999 ("Hutchinson")(SPR00001594-1605).
Petition for Inter Partes Review of U.S. Pat. No. 8,478,799 filed Aug. 11, 2017, case IPR2017-01933, 92 pages. The citations from PIR2017-01933 are submiited herewith below.
U.S. Appl. No. 61/269;633, 32 pages.
Prashant Shenoy, "Declaration of Prashant Shenoy, PhD, Under 37 C.F.R. § 1.68 in Support of Petition for Inter Partes Review of U.S. Pat. No. 8,478,799", dated Aug. 11, 2017, 196 pages.
"Curriculum Vitae of Dr. Prashant Shenoy", 2017, 31 pages.

(56) References Cited

OTHER PUBLICATIONS

Athicha Muthitacharoen, et al., "Ivy: A Read/Write Peer-to-Peer File System." Proceedings of the 5th Symposium on Operating Systems Design and Implementation (OSDI '02), Operating Systems Review, vol. 36, issue SI (Winter 2002), 21 pages.
Frank Dabek, et al., "Wide-area cooperative storage with CFS," Proceedings of the 18th ACM Symposium on Operating Systems Principles (SOSP'01), Operating Systems Review, vol. 35, No. 5 (Dec. 2001), pp. 1-19.
Nitin Agrawal, et al., "Design Tradeoffs for SSD Performance," USENIX'08: 2008 USENIX Annual Technical Conference, Jun. 25, 2008, pp. 57-70.
Marshall Kirk McKusick, et al., "The Design and Implementation of the FreeBSD Operating System", FreeBSD version 5.2, CSCO-1011, (2005), pp. 1-43.
Josh Cates, "Robust and Efficient Data Management for a Distributed Hash Table.", Jun. 2003, 64 pages.
Marice J. Bach, The Design of the UNIX Operating System (1986), 8 pages.
Prashant Shenoy, et al., "Symphony: An Integrated Multimedia File System," Proceedings of SPIE 3310, Multimedia Computing and Networking 1998, pp. 124-138.
Garth Gibson, et al., "A Cost-Effective, High-Bandwidth Storage Architecture," Proceedings of the 8th Conference on Architectural Support for Programming Languages and Operating Systems, 1998, pp. 92-103.
Mike Mesnier, et al., "Object-Based Storage," IEEE Communication Magazine, Aug. 2003, pp. 84-90.
R. Rivest, "The MD5 Message-Digest Algorithm" Request for Comments 1321, Internet Engineering Task Force, CSCO-1017, Apr. 1992, 21 pages.
Sean Quinlan, et al., "Venti: a new approach to archival storage," Proceedings of FAST 2002 Conference of File and Technologies, Jan. 28-30, 2002, pp. 1-14.
Bruce Eckel, "C++ Inside & Out", 1992, 6 pages.
Mendel Rosenblum, "The Design and Implementation of a Log LogstructuredFile System", Kluwer Academic Publishers, 1995, 3 pages.
Webster's New World Computer Dictionary, 10th Ed. 2003, 3 pages.
Microsoft Computer Dictionary, 5th Ed., 2002, 7 pages.
"AMD Athlon Processor", ADM Technical Brief, Publication # 22054, Rev. D, Issue date Dec. 1999, 10 pages.
Stevens, et al., "The first collision for full SHA-1," International Association for Cryptoloqy Research 2017, pp. 570-596.
Andrew S. Tanenbaum, "Modern Operating Systems", 2d Ed., 2001, 7 pages.
Alan Freedman, "Computer Desktop Encyclopedia 9th Ed", Osborne/McGraw-Hill, 2001, 7 pages.
Sang-Won Lee, et al., "A Case for Flash Memory SSD in Enterprise Database Applications," Proceedings of the 2008 ACM SIGMOD International Conference on Management of Data, Jun. 9-12, 2008, pp. 1075-1086.
Bruce Schneier, "Applied Cryptography, 2d Ed, Protocol, Algorithms, and Source Code in C", John Wiley & Sons, Inc., 1996, 4 pages.
Martin Placek, "Storage Exchange: A Global Platform for Trading Distributed Storage Services," Master of Engineering Science Thesis, The University of Melbourne, Australia, Jul. 2006, 185 pages.
Ragib Hasan, et al., "A Survey of Peer-to-Peer Storage Techniques for Distributed File Systems," International Conference on Information Technology: Coding and Computing, 2005, 9 pages.
"Frequently Asked Questions for FreeBSD 2.X, 3.X and 4.X", unknown date, 8 pages,. Archived at https://web.archive.org/web/20020404064240/http://www.freebsd.org:80/doc/en_US.ISO8859-1/books/faq/install.html.
"Preliminary Information, AMD Athlon, Processor Module Data Sheet", AMD Athlon, Publication #21016, Rev. M, Issue Date:Jun. 2000, 74 pages.
AMD Athlon™, "Processor Quick Reference FAQ", Feb. 3, 2000, 12 pages.

"MARC Record Information for Operating Systems Review"—Proceedings of the Fifth ACM Symposium on Operating Systems Design and Implementation (OSDI'02), available at the WRLC online catalog, accessed Jul. 20, 2017, 3 pages.
"Bibliographic Record Information for Operating Systems Review"—Proceedings of the Fifth ACM Symposium on Operating Systems Design and Implementation (OSDI'02), Dec. 9-11, 2002, available at the WRLC online catalog, accessed Jul. 20, 2017, 2 pages.
"MARC Record Information for Operating Systems Review"—Proceedings of the 18th ACM Symposium on Operating Systems Principles (SOSP'01), 2001, available at the online catalog of the Library of Congress, accessed Jul. 31, 2017, 3 pages.
"Bibliographic Record Information for Operating Systems Review"—Proceedings of the 18th ACM Symposium on Operating Systems Principles (SOSP'01), 2001, available at the online catalog of the Library of Congress, accessed Jul. 31, 2017, 3 pages.
"Operating Systems Review"—Proceedings of the 18th ACM Symposium on Operating Systems Principles (SOSP'01), vol. 35, No. 5, pp. 202-215, Oct. 21-24, 2001, obtained from a CD-ROM from Auburn University, 11 pages.
"MARC Record Information for Operating Systems Review"—Proceedings of the 18th ACM Symposium on Operating Systems Principles (SOSP'01), Oct. 21-24, 2001, CD-ROM, available at the Auburn University Library online catalog, accessed Jul. 28, 2017, 1 page.
"Bibliographic: Record Information for Operating Systems Review"—Proceedings of the 18th ACM Symposium on Operating Systems Principles (SOSP'01) CD-ROM, Oct. 21-24, 2001, available at the Auburn University Library online catalog, accessed Jul. 28, 2017, 1 pages.
"Scan of CD-ROM and CD-ROM Case, Operating Systems Review"—Proceedings of the 18th ACM Symposium on Operating Systems Principles (SOSP'01), Oct. 21-24, 2001, CD-ROM obtained from the Auburn University Library, 1 page.
Byung-Gon Chun, et al., "Efficient Replica Maintenance for Distributed Storage Systems" USENIX Association, Proceedings of NSDI '06: 3rd Symposium on Networked Systems Design & Implementation, 2006, pp. 45-58.
Dabek, F., et al., "Wide-area cooperative storage with CFS," Operating Systems Review—Proceedings of the 18th ACM Symposium on Operating Systems Principles (SOSP'01), vol. 35, No. 5, 2001, pp. 202-215.
Ingrid Hsieh-Yee, "Declaration of Ingrid Hsieh-Yee, PhD, Under 37 C.F.R. § 1.68 in Support of Petition for Inter Partes Review of U.S. Pat. No. 8,478,799", dated Aug. 10, 2017, 77 pages.
Michele Nelson, "Declaration of Michele Nelson, Under 37 C.F.R. § 1.68", dated Aug. 9, 2017, 92 pages.
David Bader, "Declaration of David Bader, Under 37 C.F.R. § 1.68", dated Aug. 10, 2017, 31 pages.
MARC Record Information,"The Design and Implementation of the FreeBSD Operating System", 2005, 2 pages, available at the online catalog of the Library of Congress, accessed Aug. 3, 2017.
Bibliographic Record Information, "The Design and Implementation of the FreeBSD Operating System", 2005, 2 pages, available at the online catalog of the Library of Congress, accessed Aug. 3, 2017.
Marshall Kirk McKusick, et al., "The Design and Implementation of the FreeBSD Operating System", FreeBSD version 5.2, 2005, 32 pages, obtained from the George Mason University Library.
MARC Record Information, "The Design and Implementation of the FreeBSD Operating System" 2005, 2 pages, available at the online catalog of the George Mason University Library, accessed Aug. 3, 2017.
Bibliographic Record Information for "The Design and Implementation of the FreeBSD Operating System", 2005, 2 pages, available at the online catalog of the George Mason University Library, accessed Aug. 3, 2017.
European Search Report and Search Opinion Received for EP Application No. 18171116.9, dated Oct. 9, 2018, 8 pages.
Shim Hyotaek Ed-Chung Lawrence et al: "PHash: A memory-efficient, high-performance key-value store for large-scale data-intensive applications", Journal of Systems & Software, vol. 123, Jan. 2017 (Jan. 2017),—Jan. 2017 (Jan. 2017), pp. 33-44.

(56) References Cited

OTHER PUBLICATIONS

Thermopylae Science + Technology, "A Scalable Indexing Technique and Implementation for Big Spatial Data," Jan. 16, 2017, pp. 1-34.

* cited by examiner

```
 1: For each dirty record in the bucket                                           ⎫
 2:     If it has an invalid page                                                  ⎬ 902
 3:         Add it to the new record list                                          ⎪
 4:     Otherwise                                                                  ⎪
 5:         Add it to the corresponding page list                                  ⎪
 6:         If it is being removed, increment the page removal count               ⎭
 7: For each page in the bucket                                                    ⎫
 8:     Available slots = Free slots + Page removal count                          ⎪
 9:     Number of records that can be added = min(Available slots, Number of new records) ⎬ 904
10:     Rank = Size of page list + Number of records that can be added             ⎪
11:     If highest rank, this is the page to flush                                 ⎭
12: Records to flush = selected page record list + new record list                 ⎫ 906
13: Read the selected page to be flushed                                           ⎭
14: For each record in the page list                                               ⎫
15:     Locate the existing record using the filter                                ⎪
16:     If record is to be removed                                                 ⎪
17:         Mark record as invalid in both the page and filter                     ⎬ 908
18:         Mark record as invalid in the dirty staging                            ⎪
19:     Otherwise, overwrite existing record with new version                      ⎪
20:         Mark record as clean in the dirty staging                              ⎭
21: For each record in the new list                                                ⎫
22:     Add the record to the page filter                                          ⎪
23:     If filter is full                                                          ⎬ 910
24:         Keep any remaining new records in dirty staging                        ⎪
25:         Write newly updated page to storage and copy new page filter to filter cache ⎪
26:     Copy record to same location in page as the location of the record added in the filter ⎪
27:     Mark record as clean in the dirty staging                                  ⎭
28: Write newly updated page to storage and copy new page filter to filter cache   ⎬ 912
```

*FIG. 9*

OPTIMIZED RECORD LOOKUPS

TECHNICAL FIELD

The present technology pertains to storage operations, and more specifically optimized record lookups in a lookup index for external media.

BACKGROUND

Data storage technologies may have various limitations, including scaling, performance, and cost limitations. For example, memory devices can provide fast access but have scaling and cost limitations. Storage devices provide larger storage capacities, but have limited throughput and access capabilities. Some storage technologies have larger storage capacities and increasing performance capabilities, but may be otherwise limited in their data access and write patterns. In many cases, such as business and mission-critical applications, data storage technologies fail to provide an adequate balance of storage capacity, performance, and availability, in order to meet specific demands for data and data services.

BRIEF DESCRIPTION OF THE DRAWINGS

Understanding that these drawings depict only example embodiments of the disclosure and are not therefore to be considered to be limiting of its scope, the principles herein are described and explained with additional specificity and detail through the use of the accompanying drawings in which:

FIG. 9 illustrates pseudocode for an example process for flushing records.

DESCRIPTION OF EXAMPLE EMBODIMENTS

Figure 1:
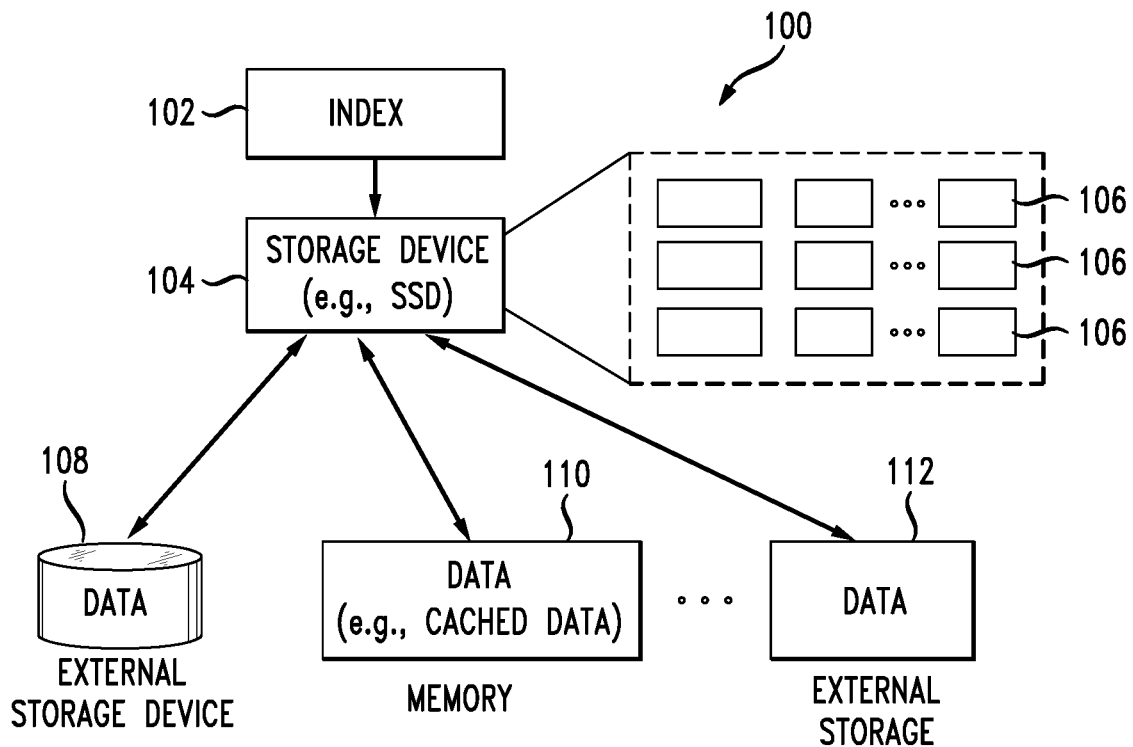
FIG. 1 illustrates example storage and lookup environment.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various features are described which may be features for some embodiments but not other embodiments.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

DESCRIPTION

Figure 10:
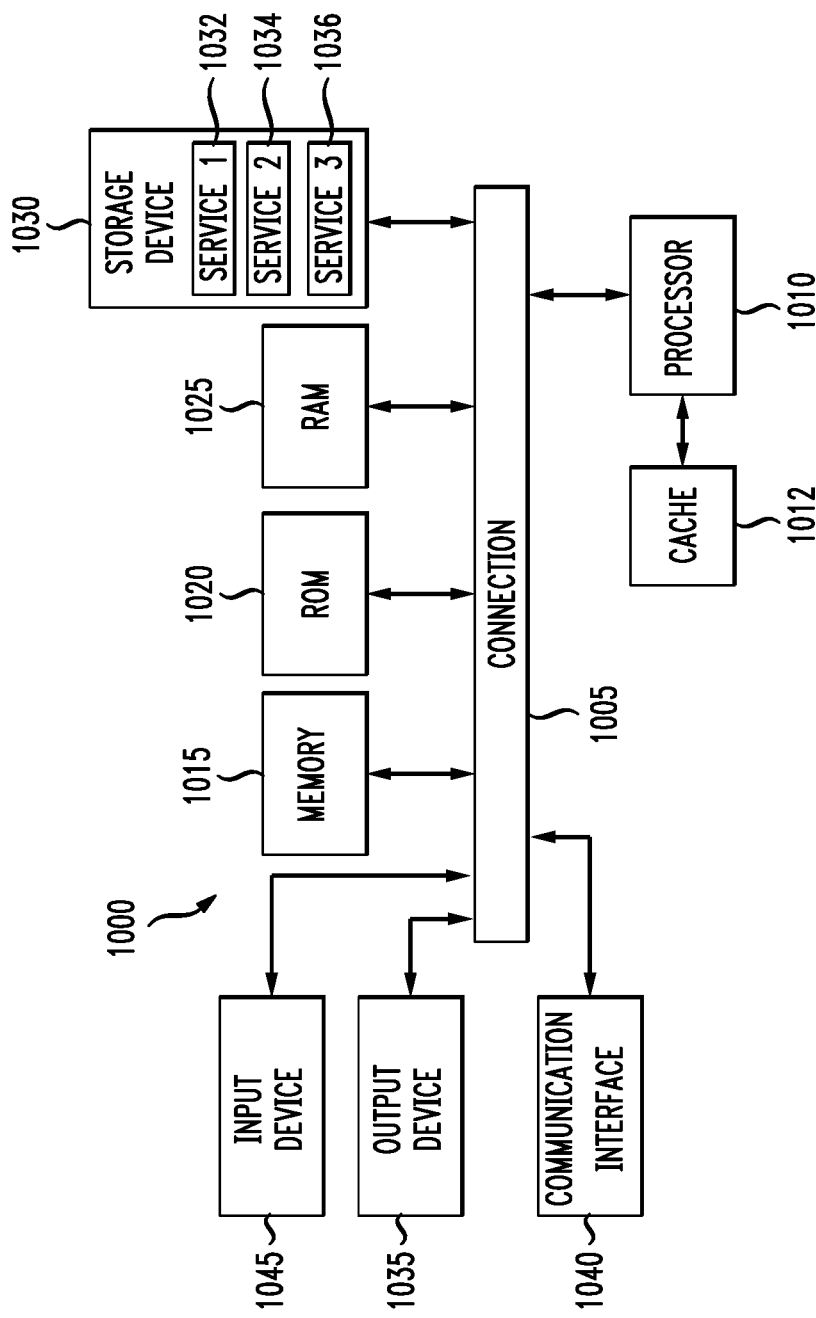
FIG. 10 illustrates an example computing device.

The disclosed technology addresses the need in the art for fast and scalable storage and resource lookup solutions. The present technology involves systems, methods, and computer-readable media for optimized storage and resource lookups and lookup indices. The present technology will be described in the following disclosure as follows. The discussion begins with an introductory discussion, as well as a description of an example storage and resource lookup environment for optimized lookups, as illustrated in FIG. 1. A more detailed description of example strategies for resource storage and lookups and I/O operations, as illustrated in FIGS. 2-9, will then follow. The discussion concludes with a description of an example computing device, as illustrated in FIG. 10, including example hardware components suitable for computing operations, including storage and resource lookup operations. The disclosure now turns to an introductory discussion of various storage concepts herein.

To increase lookup and access performance, an index can be implemented that allows a system to locate a requested data object in storage. Such an index can be stored in memory for fast access to the index and, consequently, fast access to the content on storage. However, an index can require a large amount of memory, which may impose scaling limitations. For example, 64 GB of DRAM (dynamic random-access memory) may be necessary to manage 18 TB of 8 KB data objects on an external hard-disk drive (HDD). The most common user I/Os are 4 k in size. In order to support 4 KB data objects, the index would require 128 GB of DRAM for the same amount of HDD capacity. For many, this translates into a significantly large percentage of available system memory.

Another option is to store the index in flash memory. SATA (Serial ATA) and SAS (serially-attached SCSI) SSDs are example flash memory technologies with large storage capacities. However, these storage technologies have limitations with regard to their read and write characteristics. For example, these storage technologies are typically capable of 20 k-50 k IO/s. PCIe (peripheral component interconnect express) flash devices can potentially perform better. In addition, there is an upper bound of the number of writes the storage device may accept before it fails. The following description provides various examples of lookup index and storage configurations. The disclosure now turns to FIG. 1.

FIG. 1 illustrates a schematic diagram of an example system 100 for content storage and resource lookup operations. The system 100 can include various hardware and software components as further described herein. The hardware components can be communicatively coupled via one or more connections (e.g., a bus, a network, a wired or wireless medium, etc.), and hosted within a single computing device, multiple computing devices (e.g., a cluster or server farm), and/or distributed throughout one or more networks.

The system 100 can include a storage device 104 for storing data objects, such as files. The storage device 104 can be a non-volatile memory device capable of providing persistent storage. In this example, the storage device 104 is a solid-state drive (SSD). However, other storage devices and technologies are also contemplated herein.

Internally, the writes to current SSDs are commonly managed with 4 KB-8 KB sized pages. Accordingly, for the sake of clarity and explanation purposes, the examples below will be generally described as involving 4K or 8K sized pages. However, other sizes available today or in the future can also be implemented with the approaches herein and are within the spirit of the disclosure. As used herein, the terms "pages" and "storage units" are used interchangeably to refer to units of storage on a storage device, such as storage device 104, and are not limited to any particular size, configuration, or storage architecture.

The storage device 104 can include storage units 106 for storing data. As mentioned above, the size and type of storage units 106 can depend on the storage device 104. For example, in the case of an SSD device, the storage units 106 can be SSD pages for persisting data on the SSD device and can demarcate the storage boundaries within the SSD device. In some cases, the storage units 106 can be grouped to form larger units of storage. For example, a number of storage units 106 can define a block of storage units representing a larger storage structure or unit within the storage device 104.

The system 100 can include additional storage and/or memory devices. For example, the system 100 can include an external storage device 108 for persistent storage of data, such as a hard-disk drive, an SSD device, a NAS (network-attached storage), a SATA device, a disk volume (e.g., RAID Array), etc. The term "external" to refer to the external storage device 108 is not intended to necessarily mean that the storage device 108 resides in an external location, but rather that the storage device 108 is external relative to the storage device 104. In other words, the term "external" is referenced to mean separate or different from the storage device 104. Thus, in some cases, the external storage device 108 can be internally housed within a same chassis or system as the storage device 104, or otherwise communicatively coupled via a same internal or external connection (e.g., bus or bridge).

The external storage device 108 can provide the system 100 with additional storage capabilities (e.g., storage space). In some cases, the external storage device 108 may have lower performance capabilities (e.g., TOPS, latency, etc.) than storage device 104, but may provide other advantages, such as higher storage capacity, lower storage costs, etc. In some cases, the system 100 can include other storage components 112, which can include one or more types of storage devices or technologies, storage configurations, storage roles (e.g., backup or disaster recovery, load balancing, etc.), and so forth.

The storage device 104 can store a plurality of object records, each of which can correspond to a respective object (e.g., data object such as a file) on the external storage device 108 (or any other storage device). The object records can represent respective objects on the external storage device 108 and/or can include information for locating the respective objects on the external storage device 108 (e.g., a pointer, a reference, an identifier, a resource address, etc.). The storage device 104 can also store an index 102 for resource lookup operations. The index 102 can locate objects records on the storage device 104, as well as any other objects on the storage device 104. For example, the index 102 can locate an object record stored on a particular storage unit 106 of the storage device 104. The object record on the storage device 104 can also help locate an associated object or resource on the external storage device 108, for faster lookups and access operations, as will be further described below.

The system 100 can include memory 110 (e.g., DRAM) for fast and/or temporary storage of data. For example, the memory 110 can be implemented to cache data for fast and/or recurring access. In some cases, the memory 110 can be used to cache the index 102, one or more components of the index 102, objects or object records on external storage device 108 or storage components 112, etc., for fast or recurring access. For example, as will be further described below, in some cases, the memory 110 can store one or more lookup filters associated with the index 102, which can be used to quickly locate object records on the storage device 104. Once located, an object record on the storage device 104 can locate an associated object on the external storage device 108. This mechanism can leverage the faster access performance of the memory 110 and storage device 104 while greatly reducing the amount of lookup operations performed on the external storage device 108 when accessing objects on the external storage device 108.

The system 100 can also perform various other operations on the index 102 as part of the management of the index 102 and object records, such as add, retrieve, update, and delete operations. These operations as well as other lookup concepts will be further described below.

Figure 2:
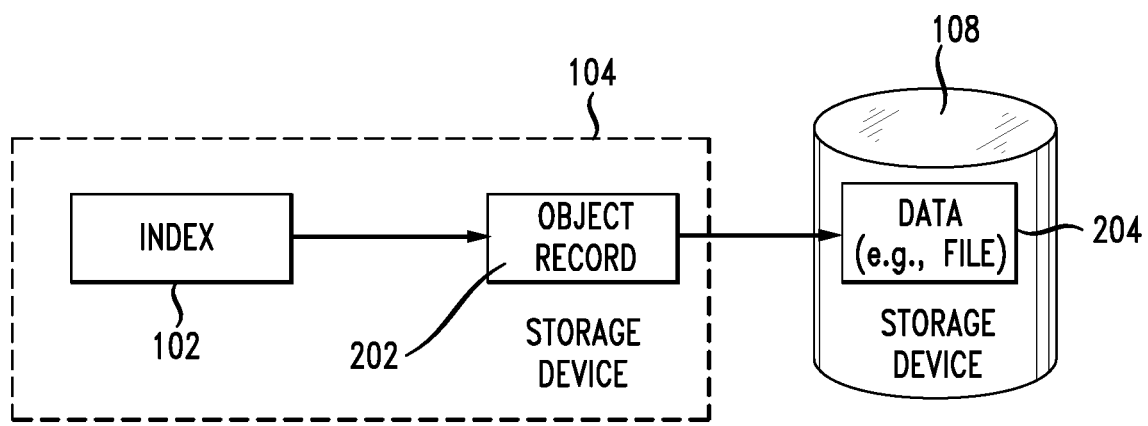
FIG. 2 illustrates an example diagram of a process for locating objects with a lookup index.

FIG. 2 illustrates a schematic diagram of an example storage operation on system 100. In this example, the storage device 104 stores an object record 202 which can include information for locating a corresponding object 204 (e.g., data object such as a file or a portion of a file) on the external storage device 108. The information in the object record 202 for locating the object 204 on the external storage device 108 can include, without limitation, a pointer, reference or address to the object 204 on the storage device 108; an identifier of the object 204; object metadata (e.g., a flag, a description, a tag, a status, etc.); a fingerprint; and/or any other information associated with the object 204 and external the storage device 108. The object record 202 can thus allow the system 100 to limit the number of read operations on the external storage device 108 necessary to locate and/or access the object 204 on the external storage device 108. This can significantly improve performance by reducing latency, delays, and I/O operations on the external storage device 108.

As previously mentioned, the storage device 104 can include the index 102, which can be used to locate the object record 202 in the storage device 104, which can further be used to locate and access the corresponding object 204 on the external storage device 108. The storage device 104 can have greater performance capabilities (e.g., speed, latency, etc.) than the external storage device 108. Thus, use of the index 102 and object record 202 on the storage device 104 to locate the object 204 on the external storage device 108 can improve the efficiency and speed of lookup and access operations pertaining to data on the external storage device 108. Storage device 104 can store respective object records for objects on the external storage device 108, which can be located via the index 102, and can be used to similarly locate those objects on the external storage device 108

Figure 3:
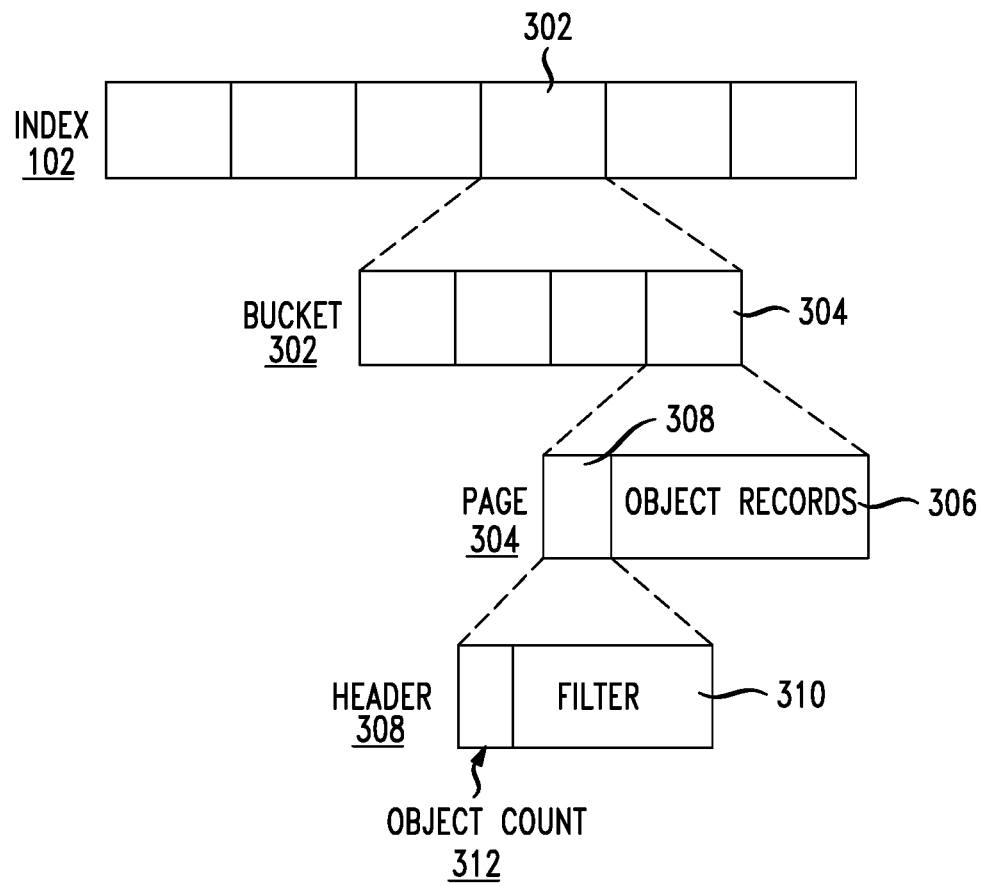
FIG. 3 illustrates an example layout of a lookup index.

FIG. 3 illustrates an example layout of the index 102. In this example, the index 102 can include buckets 302. Each bucket 302 can include multiple pages 304 or storage unit representations, which correspond to respective storage units 106 on the storage device 104. The pages 304 can include object records 306 stored on the storage device 104. Each object record can be hashed to a bucket in the index 102. Each of the pages 304 can include a header 308, which includes a lookup filter 310. The respective lookup filters 310 can represent the object records 306 in their respective pages 304, and can locate the object records within the respective pages 304. In some cases, the header 308 can also include an object count 312, which indicates the number of object records in the respective page.

As previously mentioned, the object records 306 can represent and/or locate objects on the external storage device 108. In some cases, each object record can include a hash or fingerprint of the associated object, such as a SHA-256 hash of the object or a portion of the object. The hash or fingerprint can be used to identify the specific bucket associated with an object record. In addition, the hash or fingerprint can yield uniform, random distribution of object records, which can provide various performance and load balancing benefits, as will be appreciated by one of ordinary skill in the art.

Figure 4:
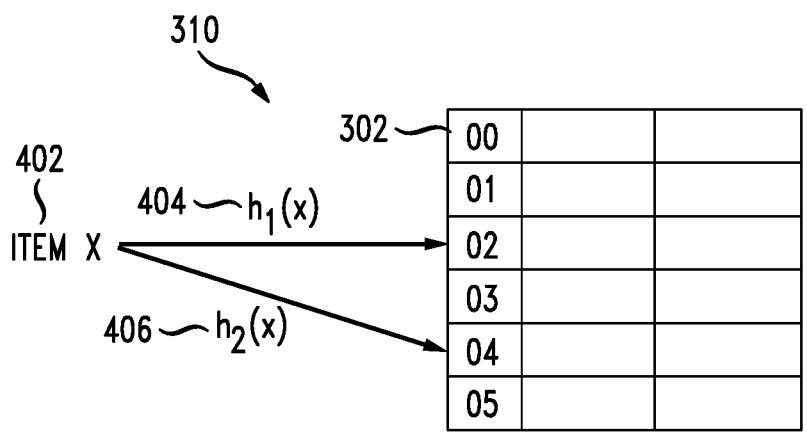
FIG. 4 illustrates an example diagram for hashing an object to a bucket in a lookup index.

For example, referring to FIG. 4, object 402 can be hashed using hashing functions 404, 406 to identify a specific bucket for the object 402 from the buckets 302 in an index. In this example, the buckets 302 include bucket 00 through bucket 05. The object 402 can be hashed using functions 404, 406, and the resulting values used to identify buckets 02 and 04 corresponding to the object 402. Thus, object 402 can be hashed to buckets 02 and 04 from the buckets 302 in the index 102.

Once a bucket is identified using the hash or fingerprint of an object, the filters 310 associated with the identified bucket can be used to identify the page or storage unit within the bucket which may contain the object record associated with the object corresponding to the hash or fingerprint. The filter 310 can be a data structure used to test whether an object is present in the page 304 associated with the filter 310. The filter 310 can definitively indicate whether an object record is not located in the respective page 304 associated with the filter 310, or otherwise indicate that the object record has a threshold probability of being in the respective page 304.

The type or structure of the filters 310 can vary in different implementations. Non-limiting examples of filters 310 can include bloom filters and cuckoo filters. For the sake of clarity and explanation purposes, cuckoo filters will be used when describing the filters 310 in the examples below.

A cuckoo filter operates as a hash table with displacement hashing, storing a portion of the originating key. The cuckoo filter offers the ability to remove entries without rebuilding the entire data structure. Moreover, the cuckoo filter can be memory efficient. The cuckoo filter can be memory efficient even when the target false positive rate is less than 3%.

As an example of a cuckoo filter, using 16 bits for each partial-key per entry can allow for 384 available spots in the filter 310. Assume the filter will reach capacity at a load factor of 90% for a full page. Using a configuration of, for example, 2 hash buckets each with 4 partial keys (e.g., fingerprints or hash values), the false positive rate, c, can be calculated given the bits/entry, (3, and the load factor, a as follows:

$$\epsilon = \frac{\alpha}{2^{(\beta(\alpha)-3)}}$$

$$\frac{.9}{2^{(16(.9)-3)}} = 0.0026\% \ FalsePositives/Page$$

A false positive rate can also be calculated across all the pages 304 within the index bucket 302. For example, assuming a 70% load factor applied to an example of 16 pages per bucket, the false positive rate can be calculated as follows:

16Pages/Bucket×70% IndexLoad×70% Utilization=7.84 UsedPages/Bucket 7.84 UsedPages×0.0026% FalsePositives/Page=0.02% FalsePositives/Bucket As illustrated in this example, the cuckoo filter can provide a low false positive rate while requiring a low memory footprint. The access pattern also allows for locality and can provide improved performance.

Object records 306 in a page 304 can be arranged in various ways for optimized performance. In one example, object records 306 can be stored in an array. New object records can then be added to the end of the array and, upon removal, the array can be rearranged to eliminate empty locations. This can optimize capacity utilization and yield fast additions. In another example, object records 306 can be arranged with a hash table. Cuckoo hashing can be used to resolve collisions. Other mechanisms can also be implemented for resolving collisions, such as linear probing. When cuckoo hashing is used, a direct mapping can be established between a slot in the cuckoo filter and an object record slot within the page. Other examples for managing object records 306 in a page can include, without limitation, a heap sort, a B-tree, etc.

The size of the index 102 can depend on a number of factors. For example, the size of the index 102 can depend on the amount of available storage capacity at the external storage device 108. To illustrate, assume the external storage device 108 has 20 TB of available storage, and data is stored as 4 KB objects. In this example, the index 102 would result in a total of 5.3 billion objects (ie., 20 TB÷ 4 KB=5,368, 709,120 Objects).

In some cases, each object may be compressed before writing to the external storage device 108, allowing additional objects to be packed together to allow for additional available capacity. For example, assuming a 5:4 average compression ratio, the index 102 would then be able to address 6.7 billion compressed objects (i.e., 5,368,709,120 Objects×1.25=6,710,886,400 Compressed Objects).

As noted before, the buckets 302 can represent a collection of pages 304 corresponding to the storage units 106 (e.g., SSD pages). In some cases, the number of pages per bucket can be sufficiently small so as to limit the number page filters 310 examined to find an object record, while also large enough to ensure enough new object record additions can be coalesced into the same bucket 302. Assume, for example, that each bucket 302 includes 16 pages 304, and the storage units 106 and pages 304 are 16 KB—although it should be noted that other sizes are possible as well, such as 4 KB or 8 KB.

Each page 304 in a bucket 302 contains a header 308 used to persist the filter 310 and object count 312 of those object records in the page 304. In some cases, the size of the header 308 can be reduced for caching in the memory 110 for fast filter lookups. Note however that the size of the header 308 can affect a false positive rate. Thus, the size can be adjusted to identify a proper balance of size and false positive rate. An example size of 1024 bytes will be used herein for illustration purposes.

While the bucket hashing will provide an even distribution on average, accommodation can be made for outlying buckets that can end up holding more records than others. Experimentation has shown buckets may stay within 10%. However, more headroom can be provided to ensure buckets will not overflow. For illustration purposes, a 70% load will be used in the example below. For 40 byte object records, this results in each bucket containing 4300 object records:

(PageSize−HeaderSize)÷RecordSize=Records/Page (16384−1024)÷40=384Records/Page

Records/Page×Pages/Bucket×LoadFactor=Records/Bucket

384×16×70%=4,300Records/Bucket

Moreover, for a 20 TB external storage device 108 capable of storing 6.7 billion objects, the resulting index 102 involves 1.5 million buckets that consume 409 GB of storage in the storage device 104:

6,710,886,400 Objects÷4,300 Records/Bucket=1,560,671 Buckets 1,560,671 Buckets×16 Pages/Bucket=24,970,736 Pages 24,970,736 Pages×16 KB=409 GB When new objects are added, the object records can be placed into a staging queue until written to the storage device 104. Each bucket can have its own staging queue. Any object records modified can have their existing data updated. The object record can be read from the storage device 104 and put on a dirty queue managed per page within the bucket. When a page is read to verify a match (as in the case of writing a duplicate object), it can be cached and potentially used to coalesce other updates for the next write. To facilitate fast retrievals for commonly accessed object records, a separate cache can be put in place to manage those unmodified object records. This can be, for example, a clean cache for the entire index 102 or otherwise managed at the bucket level. Providing this at the bucket level may allow for greater parallelism in software. This record cache can also be used to identify and manage which object records are available in a data cache associated with the storage device 104.

In some cases, non-volatile memory can be used for staging index updates so they can merged into single page writes. This staging area can hold the object records waiting to be persisted on the storage device 104, as well as buffers for data waiting to be compressed and written to the external storage device 108.

To illustrate, assume 20 index updates are required to be persisted per write to remain within the I/O capabilities of the storage device 104. As each of the buckets 302 accumulates new object records, the distribution of object records will change. If employing cryptographic hashing when identifying buckets for new object records, then the distribution of new object records among the buckets 302 will be even. Once each of the buckets 302 reaches 20 staged updates, the staged updates are flushed and each bucket's staging queue is reduced to zero. This will eventually lead to an even distribution of staged entries per bucket, meaning there will be as many empty pages as full pages and the memory required to hold them will be half of the maximum required. However, there will typically also be a mixture of duplicate objects being written which involve updates to the existing object records. The pages within a bucket can be modified and flushed individually, which results in the distribution pattern described previously. Thus, in this example, a bucket will on average only be able to flush 50% of the staging queue at a time and may be sized to accommodate a greater number of object records (e.g., 40 object records). This example brings the staging requirement to 2.5 GB as follows:

1,560,671 Buckets×(20 Records×2)=62,426,840 StagedRecords 62,426,840 StagedRecords×40 Bytes/Record=2,497 MB The data write buffers can also be stored in non-volatile memory until they can be persisted to the external storage device 108 and their addresses (e.g., logical block addresses) updated in the corresponding object record. In some cases, a new object record is not persisted to the bucket page until the data object it represents has been persisted on the backend storage (ie., storage device 108).

For efficient filter accesses, page headers 308 can be stored in volatile memory. For example, page headers 308 can be stored in memory 110. This would require 19.5 GB of memory (e.g., DRAM) in the previous example used: 24,970,736 Pages×1024 Bytes/Header=25.5 GB.

Each of the object records can include additional information to organize them for efficient accesses within the staging area. Since the staging area can be rebuilt from non-volatile memory in the case of a failure recovery, this additional data can be volatile. An example estimate can be an additional 4 bytes per object record, although other sizes are also contemplated herein. This means an additional 250 MB of memory will be needed for the example above.

A cache of object records can also be stored in memory 110 to allow for fast lookups of object records copied to the cache. The number of object records in memory 110 can be flexible, but effectiveness of the cache can be affected by the number of object records actively managed. Consider an example of 4 TB of available storage in the storage device 104. A portion of this storage (e.g., 600 GB), is also used for filesystem metadata. The rest can be used for storing uncompressed user data objects. To manage these object records in memory, nearly 68 GB would be necessary:

600 GB÷1 KB=629, 145, 600 MetadataObjects 3.4 TB÷4 KB=912, 680,550 DataObjects 629, 145, 600+912, 680, 550=1, 541, 826,150 Objects 1, 541, 826,150 Objects×44 Bytes/Record=67.84 GB On the other hand, keeping a percentage of the cached records in memory for cache management (e.g., least recently used) can reduce the memory usage. For example, keeping 20% of the cached records in memory for LRU (least recently used) cache management would only require 10 GB.

Figure 5A:
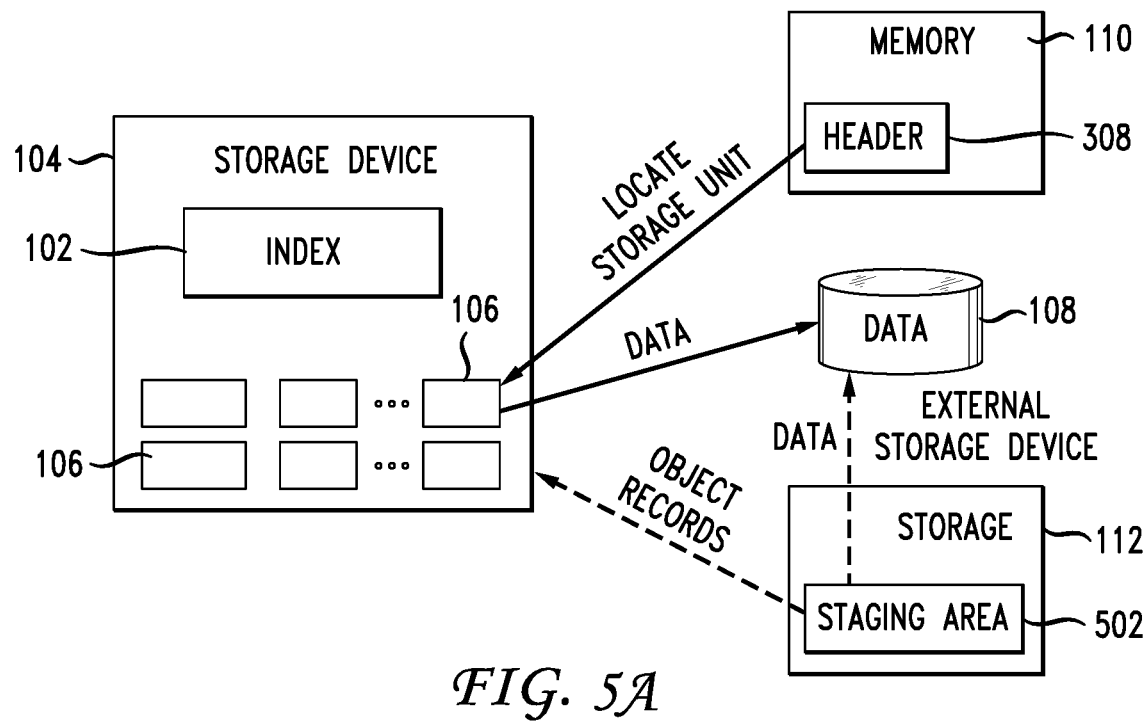
FIG. 5A illustrates a schematic diagram of an example configuration for caching headers and implementing a staging area.

FIG. 5A illustrates a schematic diagram of an example configuration for caching headers 308 and implementing a staging area. In this example, the memory 110 caches headers 308 for fast lookups of object records in the storage units 106. The object records in the storage units 106 can locate data in the external storage device 108. Thus, a lookup operation can involve first searching the headers 308 in the memory 110. The headers 308 can help locate an object record in a particular storage unit 106 on the storage device 104. Once located, the object record can be read from the particular storage unit 106 (e.g., SSD page) for verification and to locate the object within the external storage device 108.

The storage 112 can store the staging area 502 containing object records waiting to be persisted to the storage device 104 as well as buffers of data to be compressed and written to the external storage device 108. Updates associated with a bucket can be accumulated and later persisted into a single page write (ie., a single storage unit write) for greater throughput and performance.

Figure 5B:
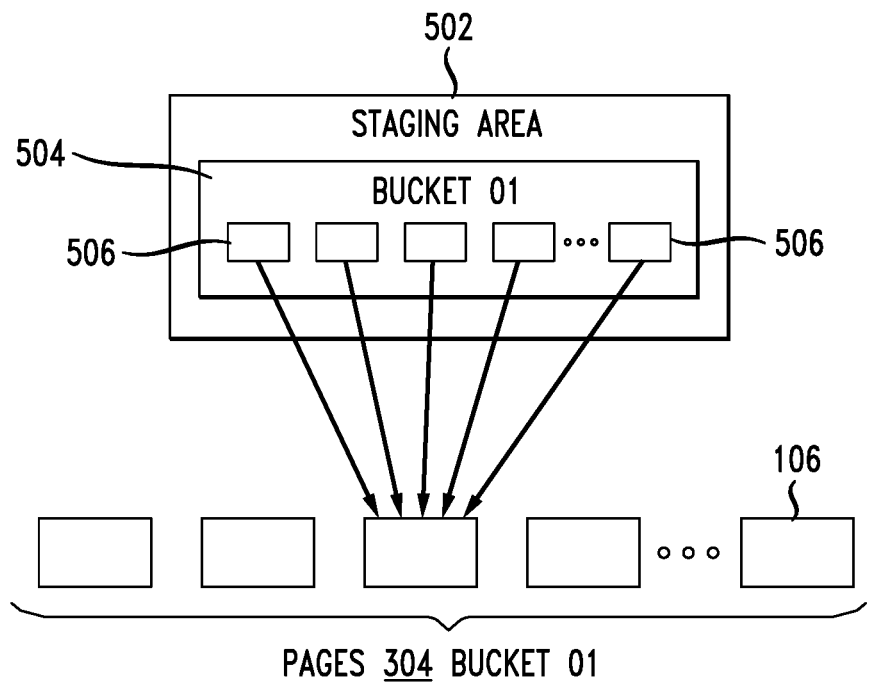
FIG. 5B illustrates a schematic diagram of an example staging area for a bucket in a lookup index.

FIG. 5B illustrates a schematic diagram of an example staging area for a bucket. In this example, the staging area 502 contains a bucket staging area 504 for bucket 01. The bucket staging area 504 contains updates 506 for objects associated with bucket 01. The updates 506 can include, without limitation, object records to be persisted to the storage device 104 and included in one or more corresponding storage unit representations in the index 102.

The bucket staging area 504 can coalesce the updates 506 and write the multiple updates to a single storage unit 106 associated with bucket 01. By coalescing the updates 506 to be written to a single storage unit 106 associated with bucket 01, the I/O throughput can be increased. For example, 20 Gb/s of throughput may require 512 k index updates per second for 4 KB data objects. With each update requiring two I/Os for a read-modify-write operation, this would require between 10-50 updates for each write to the storage device 104. In addition, performance for retrieving an index object record can be increased with this mechanism, which can combine multiple updates per write while involving in many cases a single read per retrieval. Additionally for lookup cases where the object record does not exist, over 99% of the time no read would be required.

Thus, as illustrated in FIGS. 5A and 5B, when new objects are added, the object records can be placed into the staging area 502 until written to the storage device 104. Each bucket can have its own staging queue (e.g., bucket staging area 504 for bucket 01). Any object records modified can have their existing data updated. The object record can be read from the storage device 104 and then put on a dirty queue managed per page within the bucket. When a page is read to verify a duplicate, it can be cached and potentially used to coalesce other updates for the next write. To facilitate fast retrievals for commonly accessed object records, a separate cache in memory 110 can be used to manage those unmodified object records. The cache can be for the entire index 102 or one or more specific buckets.

Figure 6:
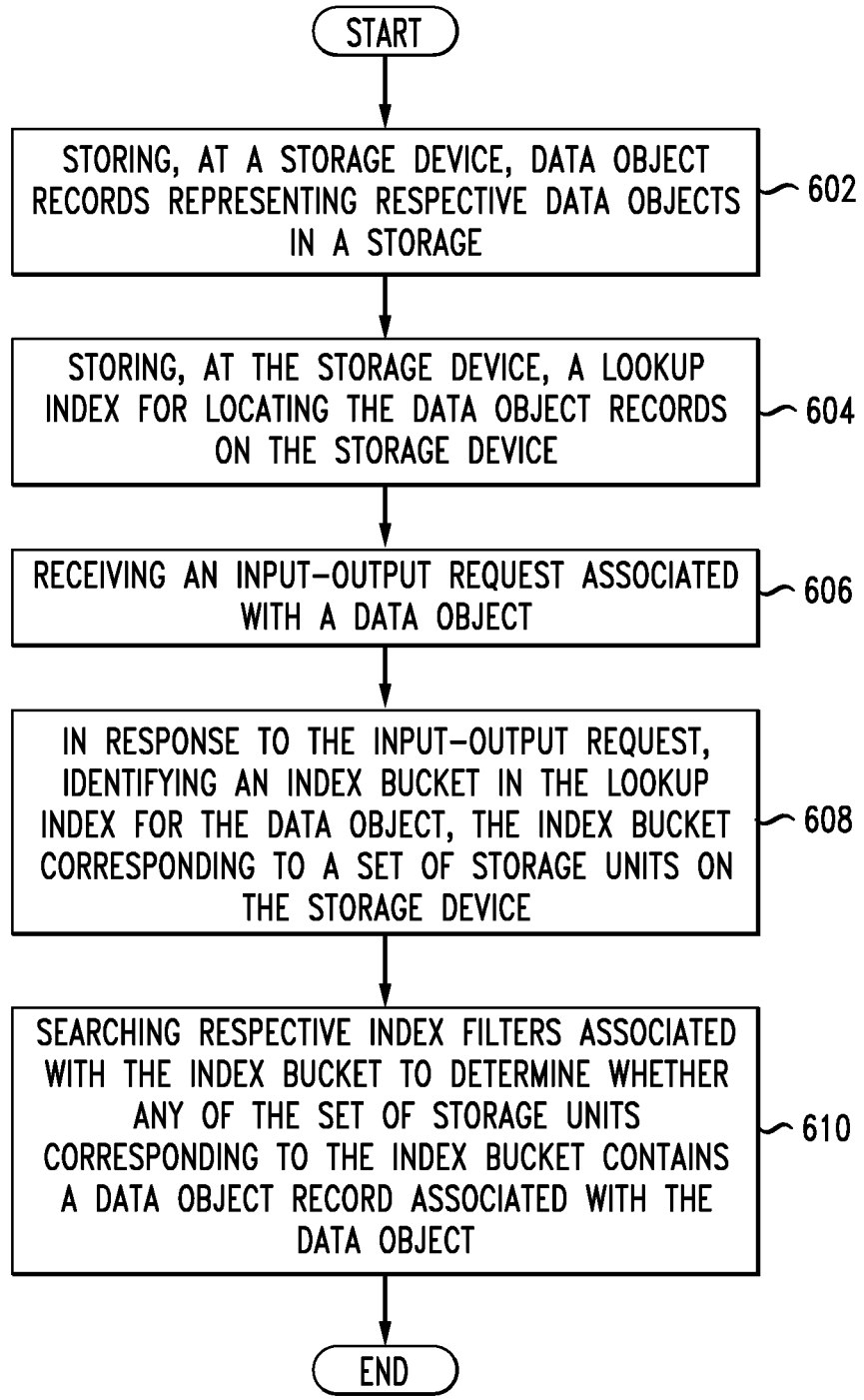
FIG. 6 illustrates an example method for performing a lookup operation.

FIG. 6 illustrates an example method for implementing a lookup index 102. At step 602, the method can involve storing, on the storage device 104, object records (e.g., object records 306) representing data objects on an external storage device (e.g., storage device 108). The object records can locate the data objects in the external storage device in lookup and I/O operations, including read, write, etc. For example, the object records can include pointers, references, addresses (e.g., LBA), identifiers, metadata, etc., corresponding to the data objects in the external storage device.

The storage device 104 can have better performance characteristics (e.g., IOPS, latency, speed, etc.) than the external storage device. Thus, the object records stored on the storage device 104 can be used to limit lookup operations on the external storage device and improve lookup performance.

At step 604, the method can involve storing, at the storage device 104, a lookup index 102 for locating the data object records on the storage device 104. The lookup index 102 can include buckets 302, each of which can contain a set of storage unit representations (e.g., pages) corresponding to specific storage units 106 on the storage device 104. The specific storage units 106 can belong to a specific bucket in the lookup index 102. Moreover, the specific storage units can store a specific set of the object records representing the data objects on the external device. The object records stored on a storage unit associated with a bucket can be specifically selected for that bucket. For example, the object records can be hashed to identify a specific bucket for the object records, and stored in specific storage units associated with the identified bucket.

The set of storage unit representations in a bucket can include information for locating the object records stored on the specific storage units associated with the set of storage unit representations. For example, the set of storage unit representations can include a respective hash or fingerprint of the objects or object records associated with the specific storage units.

The lookup index 102 can also include index filters. In some cases, each of the set of storage unit representations can include a respective index filter. The respective index filter can locate object records on the respective storage unit representation associated with the respective index filter, which can thus locate the object record within the storage unit associated with the respective storage unit representation. For example, the respective index filter can include one or more lookup entries corresponding to each object record on the storage unit associated with the respective storage unit.

At step 606, the method can involve receiving an input-output request (e.g., lookup request such as read, retrieve, write, etc.) associated with a data object. The data object can be a data object stored on the external storage device. At step 608, the method can involve, in response to the input-output request, identifying an index bucket in the lookup index 102 for the data object, the index bucket corresponding to a set of specific storage units on the storage device 104. The index bucket in the lookup index 102 can be identified for the data object based on a hash or fingerprint of the data object. For example, the data object can be hashed to identify a specific bucket for that data object. Once the bucket is identified for the data object, the storage units on the storage device 104 which may store the object record for the data object can be easier to identify as the search can be constrained to those storage units associated with the bucket identified.

At step 610, the method can involve searching the respective index filters associated with the index bucket identified to determine whether any of the storage units corresponding to the index bucket contains a data object record associated with the data object. For example, the method can search for a hash, fingerprint, or identifier of the object record in the respective filters. If a search in a respective filter does not yield a match, a determination can be made that the storage unit associated with the respective filter does not contain the object record. If the search in the respective filter does yield a match, a determination can be made that the object record has a threshold probability of being present in the storage unit associated with the respective filter. The method can verify this determination by reading the storage unit to confirm that the object record is indeed present in the storage unit. If the method identifies the object record in the storage unit, it can read the object record to locate the data object on the external storage device. This mechanism can thus greatly limit the number of lookup operations in the storage device 104 as well as the external storage device, and can increase the performance for the lookup operation.

If the search does not yield any matches or otherwise yields a false positive, a determination can be made that the object is a new object. The object can then be written to the external storage device as previously explained, and the index 102 and storage device 104 can be updated to account for the object record of the object, as previously described and further explained below.

Figure 7:
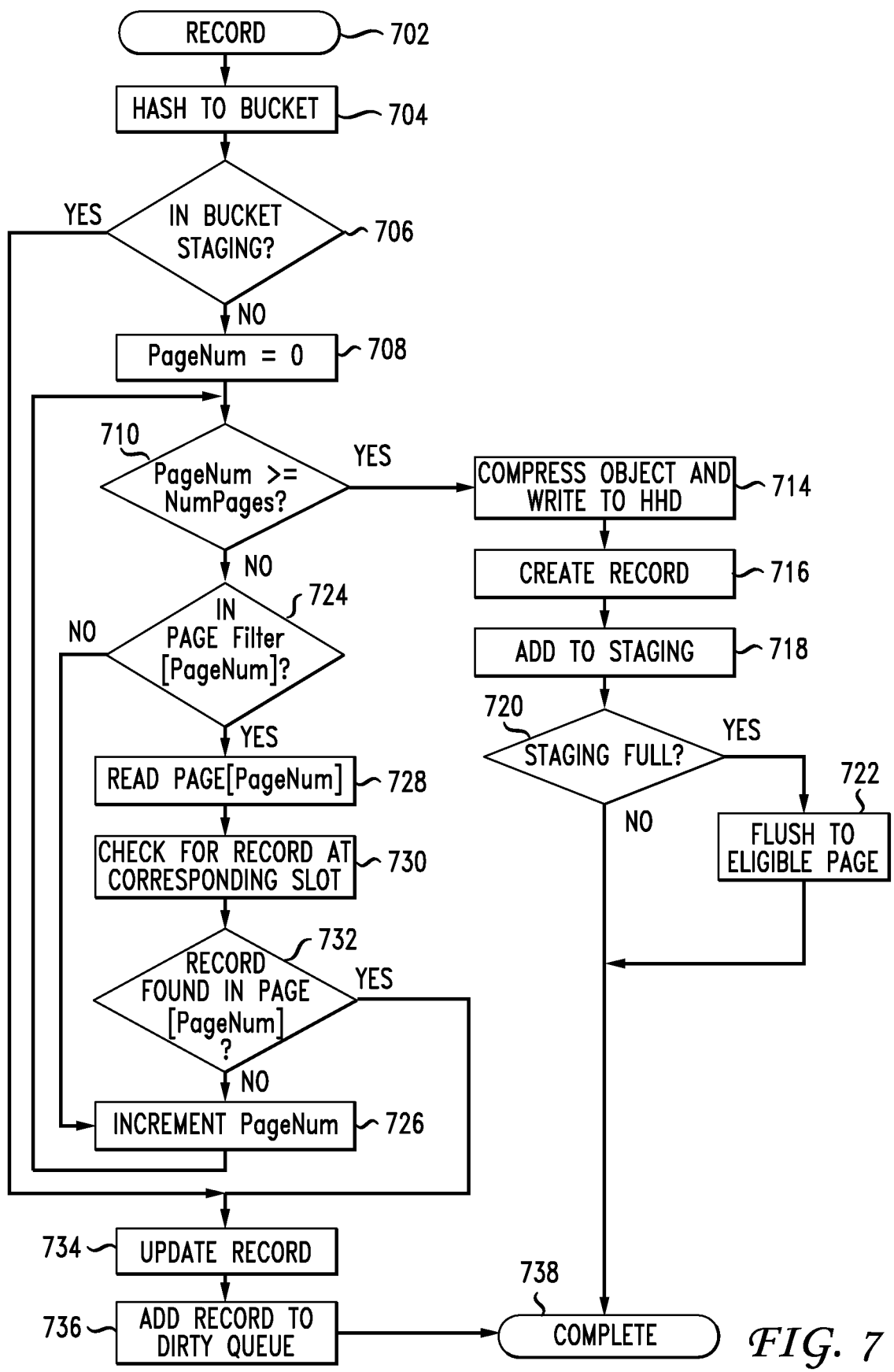
FIG. 7 illustrates a flowchart of an example method for adding or updating an object record in a lookup index.

FIG. 7 illustrates a flowchart of an example method for adding and updating an object record to the index 102. At step 702, the method involves obtaining an object record associated with an object. At step 704, the method involves hashing the object record to identify a bucket corresponding to the object record. For example, this operation can involve using the first 64 bits of the object SHA-256 with a mod operation using the number of available buckets.

At step 706, the method can involve determining if the object record is in the staging area (e.g., staging area 502). If the object record is already in the staging area, the method can involve at step 734 updating the record and at step 736, adding the record to the dirty queue.

If the object record is not in the staging area, the method can begin a loop or iterative process to check the pages in the bucket for the object record. Thus, at step 708, the method can set the page number (e.g., PageNum) to zero in order to begin an iterative process for searching the pages. At step 710, the method can determine if the page number (e.g., current page being checked) is greater or equal to the number of pages (e.g., NumPages) in the bucket. This step will allow the method to determine if it has checked all of the pages in the bucket for the object record. A determination that the page number is greater or equal to the number of pages in the bucket would indicate that all of the pages in the bucket have been checked. If the object record was not located in any of the pages after all the pages in the bucket have been checked, then the object record is a new record and the method proceeds to step 714 as further described below.

If the page number is not greater or equal to the number of pages, then the method proceeds to step 724 to continue checking pages for the object record until the object record is located in a page (ie., storage unit) or all the pages in the bucket have been checked without a hit. Thus, at step 724, the method determines whether the object record is located in the page filter associated with the page number. If the method does not locate the object record in the page filter associated with the page number, it increments the page number at step 726 and returns to step 710 to check if there are any remaining pages that have not been checked. On the other hand, if the method at step 724 locates the object record in the page filter associated with the page number, it proceeds to step 728 to read the page associated with the page number and step 730 to check for the object record. When reading the page, the method can retrieve the object record and analyze the object record to verify that the object record is indeed in the page. The method can check for the object record in a corresponding slot in the page. The corresponding slot can be a location within the page that is associated with the object record. For example, the slot that likely contains the object record being searched (e.g., object record X) corresponds to the filter slot that yielded a hit or match in step 724. To illustrate, if on page N and filter slot M there is a match for X, then there is a high probability that the slot M on page N contains the object record X. If on page N and filter slot M there is no match, then a determination can be made that the slot M on page N does not contain the object record X.

If the object record is not found in the page, the method proceeds to step 726 to increment the page number and return to step 710. If the object record is found in the page, the method proceeds to step 734 to update the record. When updating the record, the method can, for example, modify the reference count associated with the record, change the address (e.g., LBA) in storage associated with the object, etc. At step 736, the method can add the record to the page's dirty queue to be written later.

Returning to step 710, as previously mentioned, if the page number is greater than or equal to the number of pages in the bucket and the method has not located the object record in any of the pages, then the method proceeds to step 714. The lack of hits for the object record in any pages would indicate that the object associated with the object record is a new unique object. Accordingly, at step 714, the method compresses the object associated with the object record and writes the object to the external storage device (e.g., storage device 108). The method then proceeds to step 716 to create an object record and step 718 to add the object record to the staging area of the bucket. The method can update the entry of the object record with the address (e.g., LBA) of the object.

At step 720, the method determines whether the staging area of the bucket is full. If the staging area is not full, at step 738 the method ends or completes. If the staging area is full, the method proceeds to step 722 to flush the staging area to an eligible page. An example process for flushing the staging area is further described below with reference to FIG. 9.

Figure 8:
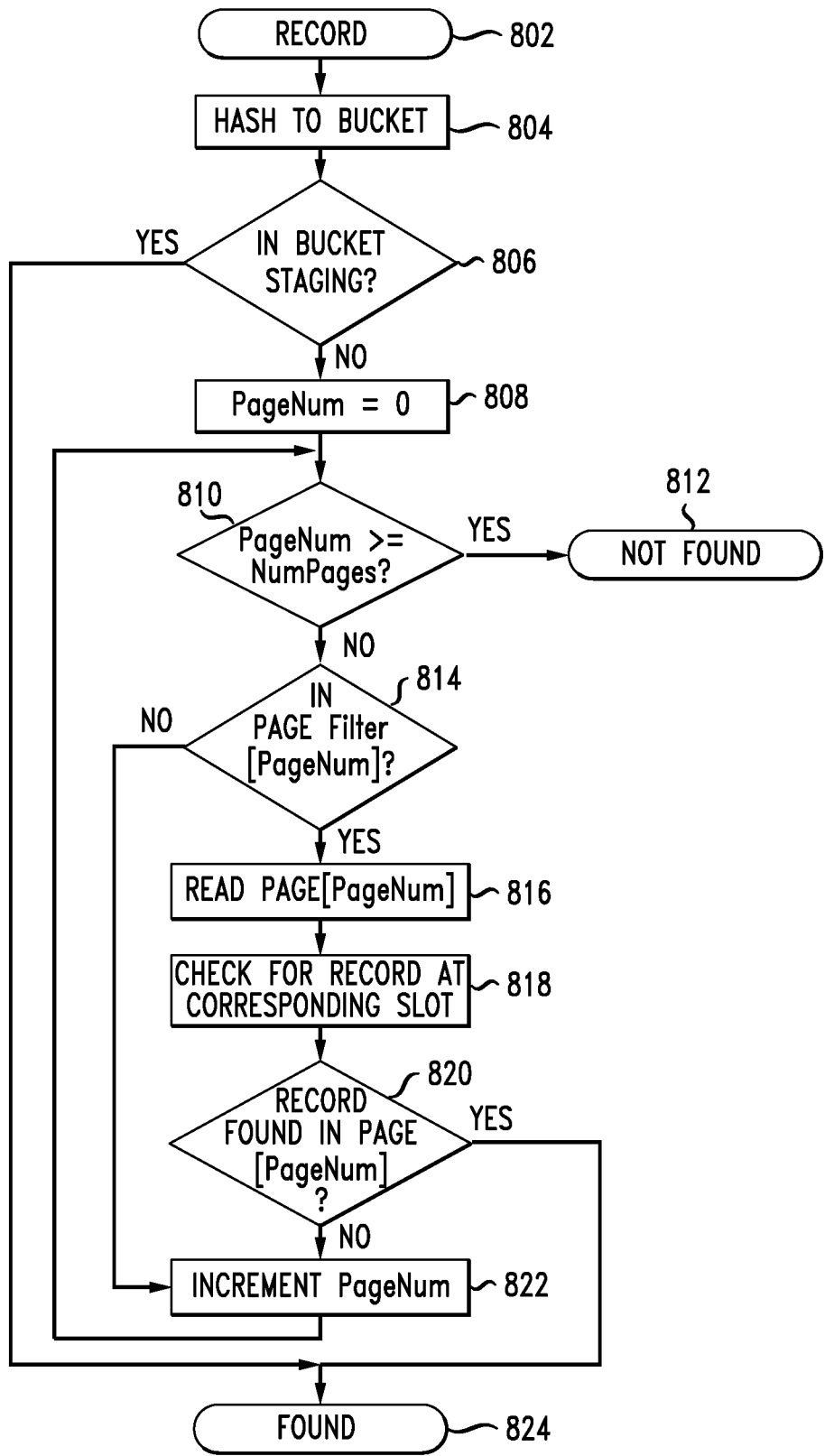
FIG. 8 illustrates a flowchart of an example method for performing a lookup of an object record in a lookup index.

FIG. 8 illustrates a flowchart for an object record lookup process. At step 802, the method can identify an object record for retrieving from the index 102. At step 804, the method can hash the object record to identify a bucket corresponding to the object record. At step 806, the method can involve determining if the object record is already in the bucket staging area. If the object record already in the bucket staging area, at step 824 the method can find the object record from the bucket staging area.

If the object record is not in the bucket staging area, the method can proceed to step 808 and set the page number (e.g., PageNum) to zero in order to begin an iterative process to search the pages for the object record. At step 810, the method can determine if the page number (e.g., current page being checked) is greater or equal to the number of pages (e.g., NumPages) in the bucket. This will allow the method to know when all the pages in the bucket have been checked for the object record, as previously explained in FIG. 7. If the object record has not been located in any of the pages after all the pages in the bucket have been checked (ie., when the page number is greater or equal to the number of pages), then the method proceeds to step 812 and determines that the object record is not found.

Otherwise, the method proceeds to step 814 to search for the object record on the filter of the current page in the bucket (ie., the page associated with the current page number in the iterative process). If the search does not yield any matches, then the method proceeds to step 822 to increment the page number and returns to step 810 to check if the incremented page number is greater or equal to the number of pages in the bucket.

If the search yields a match, at step 814, the method can proceed to step 816 to read the page and step 818 to check for the object record in the corresponding slot of the page. If the object record is not found in the corresponding slot of the page at step 818, the method proceeds to step 822 to increment the page number and returns to step 810 in the iterative process. Otherwise, the method proceeds to step 824 and determines that the object is found in the index 102.

FIG. 9 illustrates example pseudocode for a process to flush object records, such as the flush step 722 illustrated in FIG. 7. In this example, the process can find a bucket page that can have the most dirty entries flushed to it. The process can thus flush as many changes as possible to a single page in the bucket. This allows optimal use of each page write to storage. The process can examine the contents of the dirty cache to determine if the object records are already associated with a page or if the object records are new records that can be written anywhere within the bucket. Each dirty record can contain a page identifier. If an object record has never been flushed, it can contain a specified invalid page number, which indicates the object record is a "new record". As the process iterates the dirty cache, it can create a list of object records associated with each page and record a count of how many object records should be removed from that page. The process can also rank each page associated with the bucket based on the respective number of records that can be updated in the page. When finished, the process can identify the page to flush to and a list of object records to be flushed to that page.

For example, the pseudocode can include code blocks 902, 904, 906, 908, 910, 912 for performing various steps in the flush process. Code block 902 determines if a dirty record should be added to the new record list or a corresponding page list. For each dirty record in the bucket, the code block 902 checks if the page number associated with the dirty record is an invalid page number. The page number can be determined based on a page identifier in the dirty record. If the page number is an invalid page, the dirty record is added to the new record list, otherwise the dirty record is added to the page list of its corresponding page. If the dirty record is being removed, the page removal count of the corresponding page can be incremented.

Code block 904 identifies which page in the bucket the dirty records should be flushed to. For each page in the bucket, the available slots are calculated by adding the number of free slots and the page removal count. The number of records that can be added to the page is then calculated based on the available slots calculated for the page or the number of new records in the new record list. The page is also ranked based on the size of the page list (e.g., the number of dirty records added to that page's list) and the number of records that can be added to the page. A page to flush is selected from the pages in the bucket based on the rank calculated for each page. Here, the page having the highest rank can be selected as the page to flush.

Code block 906 determines the records to flush by concatenating the record list of the selected page and the new record list previously created.

Code block 908 processes existing records in the page list of the selected page. For each record in the page list, the existing record is located using the filter associated with the page. If the record is to be removed, the record is marked as invalid in the page and the filter, as well as the dirty staging area. Otherwise, the existing record is overwritten with a new version and the record is marked as clean in the dirty staging area.

Code block 910 processes the new records in the new record list. For each record in the new record list, the record is added to the page filter. If the filter is full, the record is kept in the dirty staging, the newly updated page is written to storage and the new page filter is copied to the filter cache. Moreover, the record is copied to the same location in the page as the location of the record in the filter, and the record is marked as clean in the dirty staging area.

Code block 912 writes the newly updated page to storage (e.g., storage device 104) and copies the new page filter to the filter cache.

The disclosure now turns to FIG. 10, which illustrate example hardware components and an example device architecture for a computing device. In particular, FIG. 10 illustrates an example computing system architecture 1000 wherein the components of the system 1000 are in communication with each other using a connection 1005. Connection 1005 can be a physical connection via a bus, or direct connection into processor 1010 such as in a chipset architecture. Connection 1005 can also be a virtual connection, networked connection, or logical connection.

In some cases, the system 1000 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1000 includes at least one processing unit (CPU or processor) 1010 and a connection 1005 that couples various system components including the system memory 1015, such as read only memory (ROM) 1020 and random access memory (RAM) 1025 to the processor 1010. The system 1000 can include a cache of high-speed memory 1012 connected directly with, in close proximity to, or integrated as part of the processor 1010.

The processor 1010 can include any general purpose processor and a hardware service or software service, such as service 1 1032, service 2 1034, and service 3 1036 stored in storage device 1030, configured to control the processor 1010 as well as a special-purpose processor where software instructions are incorporated into the actual processor design. The processor 1010 may essentially be a completely self-contained computing system, containing multiple cores or processors, a bus, memory controller, cache, etc. A multi-core processor may be symmetric or asymmetric.

To enable user interaction with the computing device 1000, an input device 1045 can represent any number of input mechanisms, such as a microphone for speech, a touch-sensitive screen for gesture or graphical input, keyboard, mouse, motion input, speech and so forth. An output device 1035 can also be one or more of a number of output mechanisms known to those of skill in the art. In some instances, multimodal systems can enable a user to provide multiple types of input to communicate with the computing device 1000. The communications interface 1040 can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1025, read only memory (ROM) 1020, and hybrids thereof.

The storage device 1030 can include code that when executed by the processor 1010, causes the system 1000 to perform a function. A hardware service that performs a particular function can include the software component stored in a computer-readable medium in connection with the hardware components, such as the processor 1010, bus 1005, output device 1035, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A method comprising:
   generating data object records comprising object signatures corresponding to data objects in an external storage device, the object signatures being generated by applying one or more hash functions to the data objects;
   storing, at a high-speed persistent storage device communicatively coupled to the external storage device, a lookup index comprising a plurality of index buckets, each index bucket being associated with a set of storage units on the external storage device and comprising a header which includes:
   an object count indicating a number of object records in a respective storage unit; and
   a respective index filter for each respective one of the set of storage units, the set of storage units containing a respective portion of the data object records, wherein each respective index filter comprises a cuckoo filter and at least one lookup entry for each of the data object records in the respective one of the set of storage units, the at least one lookup entry comprising at least a partial object signature associated with a corresponding data object record in the respective one of the set of storage units and the partial object being generated by applying one or more hash functions to the data objects;

receiving an input-output request associated with a data object;

in response to the input-output request, performing a lookup operation for the data object on the lookup index, the lookup operation comprising:
 hashing at least part of the data object to yield a hash value, and
 using at least part of the hash value to identify an index bucket in the lookup index for the data object; and based on each respective index filter associated with the index bucket identified in the lookup index for the data object, determining whether any of the set of storage units associated with the index bucket contains a data object record corresponding to the data object.

2. The method of claim 1, further comprising:
 storing, at a memory device, a copy of the respective index filter of each respective one of the set of storage units to yield a plurality of cached index filters, the plurality of cached index filters containing respective lookup entries associated with data object records contained in the set of storage units; and
 wherein determining whether any of the set of storage units contains the data object record comprises determining whether the respective lookup entries match one or more hash values generated for the data object.

3. The method of claim 2, wherein the input-output request comprises a read operation, and wherein identifying the index bucket for the data object is based on the one or more hash values generated for the data object, the method further comprising:
 prior to determining whether any of the set of storage units associated with the index bucket contains the data object record, searching a staging area associated with the index bucket for the data object record, wherein the staging area comprises a queue of data object records selectable for copying to one of the set of storage units associated with the index bucket; and
 when the searching fails to locate the data object record in the staging area, determining whether any of the set of storage units associated with the index bucket contains the data object record.

4. The method of claim 3, further comprising:
 based on the one or more hash values generated for the data object, identifying a particular storage unit in the index bucket having a threshold probability of containing the data object record associated with the data object;
 in response to identifying the particular storage unit in the index bucket, reading the particular storage unit and checking a corresponding slot in the particular storage unit to determine whether the data object record is contained in the particular storage unit; and
 retrieving the data object record from the particular storage unit when the data object record is determined to be in the particular storage unit.

5. The method of claim 2, further comprising:
 when the respective lookup entries do not match the one or more hash values generated for the data object, determining that the data object is a new data object and the data object record does not exist in any of the set of storage units;
 in response to determining that the data object is the new data object, writing the data object to the storage;
 updating the data object record associated with the data object to include an indication of an address on the storage associated with the data object; and
 sending the data object record to a staging area associated with the index bucket.

6. The method of claim 5, further comprising:
 determining that the number of specific data object records in the staging area has reached the threshold number; and
 in response to determining that the number of specific data object records in the staging area has reached the threshold number, copying the number of data object records in the staging area to a same storage unit in the index bucket.

7. A system comprising:
one or more processors;
a computer-readable storage medium storing a lookup index, the lookup index comprising:
 a plurality of index buckets, each of the index buckets being associated with a set of storage units on the computer-readable storage medium;
 a plurality of data object records comprising object signatures corresponding to data objects on an external storage device wherein:
  the object signatures are generated by applying one or more hash functions to the data objects, and
  the plurality of data object records are stored in the storage units with each storage unit storing a respective portion of the plurality of data object records, the respective portion corresponding to a particular index bucket associated with the storage unit; and
 a plurality of headers, each of the headers including:
  an object count indicating a number of object records in a respective storage unit; and
  an index filter stored in the storage units, each storage unit storing a respective index filter from a plurality of index filters comprising cuckoo filters, the respective index filter comprising at least one lookup entry corresponding to each of the respective portion of the plurality of data object records in the storage unit wherein the at least one lookup entry comprises at least a partial object signature associated with a corresponding data object record in the respective one of the set of storage units and the partial object is generated by applying one or more hash functions to the data objects; and
computer-readable instructions stored on the computer-readable storage medium which, when executed by the one or more processors, cause the system to:
 in response to one or more input-output requests associated with a data object,
  hashing at least part of the data object to yield one or more hash values; and
  identifying the corresponding index bucket based on the one or more hash values,
 query the respective index filter in each of the respective set of storage units associated with the corresponding index bucket for a data object record associated with the data object; and
 determine whether any of the set of storage units associated with the corresponding index bucket contains the data object record.

8. The system of claim 7, further comprising a second computer-readable storage medium storing the plurality of index filters, wherein determining whether any of the set of storage units associated with the corresponding index bucket contains the data object record comprises:

applying one or more hash functions to the data object to yield one or more hash values associated with the data object; and searching the one or more hash values within filter entries in at least a portion of the plurality of index filters, the portion of the plurality of index filters corresponding to index filters associated with the respective set of storage units in the corresponding index bucket.

9. The system of claim 8, wherein the one or more input-output requests comprise one or more read operations, the system further comprising additional computer-readable instructions which, when executed by the one or more processors, cause the system to:

when the one or more hash values match at least one of the filter entries:
determine that a storage unit associated with the particular index filter has at least a threshold probability of containing the data object record;
based on the storage unit having at least the threshold probability of containing the data object record, perform a read of the storage unit to search for the data object record; and
retrieve the data object record from the storage unit when the data object record is located in the storage unit.

10. The system of claim 8, further comprising additional computer-readable instructions which, when executed by the one or more processors, cause the system to:

when the one or more hash values do not match at least one of the filter entries or the data object record is not located in the storage unit after the read, determine that the data object is a new data object and the storage units do not contain the data object record.

11. The system of claim 10, further comprising additional computer-readable instructions which, when executed by the one or more processors, cause the system to:

in response to determine that the data object is the new data object, writing the new data object to the storage device;
update the data object record associated with the new data object to indicate an address on the storage device associated with the new data object; and
send the data object record to a staging area associated with the corresponding index bucket, wherein the staging area stores specific data object records queued for copying to one of the set of storage units.

12. A non-transitory computer-readable storage medium comprising:

storage units storing data object records comprising object signatures corresponding to data objects in an external storage device, wherein the object signatures are generated by applying one or more hash functions to the data objects;
a lookup index comprising a plurality of index buckets, each index bucket being associated with a set of the storage units and comprising a header stored in a high-speed persistent storage device, the header including:
an object count indicating a number of object records in a respective storage unit; and
a respective index filter for each respective one of the set of storage units, the set of storage units containing a respective portion of the data object records, wherein each respective index filter comprises a cuckoo filter and at least one lookup entry for each data object record in the respective one of the set of storage units, the at least one lookup entry comprises at least a partial object signature associated with a corresponding data object record in the respective one of the set of storage units and the partial object is generated by applying one or more hash functions to the data objects; and computer-readable instructions stored thereon which, when executed by one or more processors, cause the one or more processors to:
receive an input-output request associated with a data object; and
in response to the input-output request, perform a lookup operation for the data object on the lookup index, the lookup operation comprising:
hashing at least part of the data object to yield a hash value, and
using at least part of the hash value to identify an index bucket in the lookup index for the data object; and
based on each respective index filter associated with the index bucket identified in the lookup index for the data object, determining whether any of the set of storage units associated with the index bucket contains a data object record corresponding to the requested data object.

13. The non-transitory computer-readable storage medium of claim 12, wherein the computer-readable storage medium storing additional instructions which, when executed by the one or more processors, cause the one or more processors to:

prior to determining whether any of the set of storage units associated with the index bucket contains the data object record, search a staging area associated with the index bucket for the data object record, wherein the staging area comprises a queue of data object records selectable for copying to one of the set of storage units in the index bucket; and
when the search fails to locate the data object record in the staging area, determine whether any of the set of storage units associated with the index bucket contains the data object record by searching for the one or more hash values within filter entries in each respective index filter associated with the set of storage units associated with the index bucket.

14. The non-transitory computer-readable storage medium of claim 12, wherein determining whether any of the set of storage units associated with the index bucket contains the data object record comprises:

when the one or more hash values match at least one of the filter entries:
determine that a particular storage unit associated with the index filter has at least a threshold probability of containing the data object record;
based on the storage unit having at least the threshold probability of containing the data object record, perform a read of the particular storage unit and check a corresponding slot in the particular storage unit for the data object record; and
retrieve the data object record from the particular storage unit when the data object record is located in the particular storage unit.

15. The non-transitory computer-readable storage medium of claim 14, wherein determining whether any of the set of storage units associated with the index bucket contains the data object record further comprises:

when the one or more hash values does not match at least one of the filter entries:

determine that the data object is a new data object and the set of storage units do not contain the data object record associated with the new data object;

write the new data object to the storage;

update the data object record to include an indication of an address of the new data object; and send the data object record to the staging area associated with the corresponding index bucket.

* * * * *